June 15, 1926.
J. P. FERRIS
BROACH GUIDE
Filed Feb. 16, 1924
1,588,716
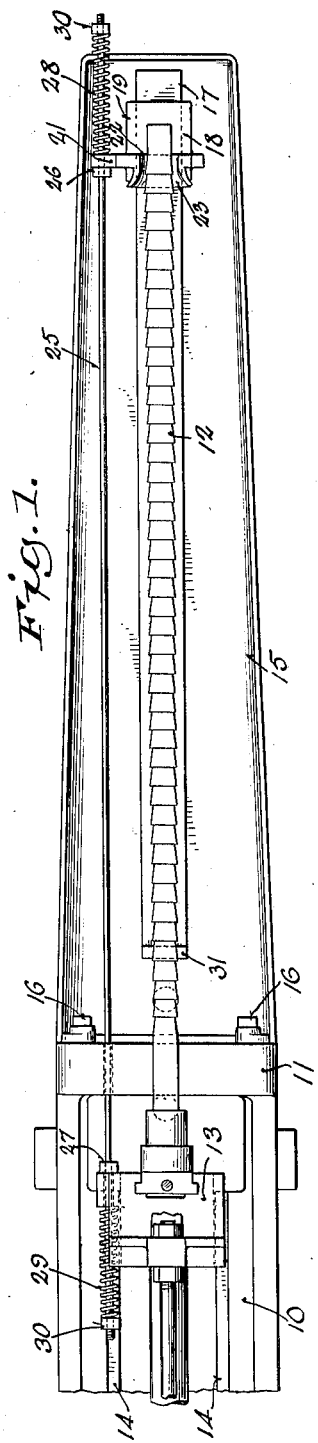
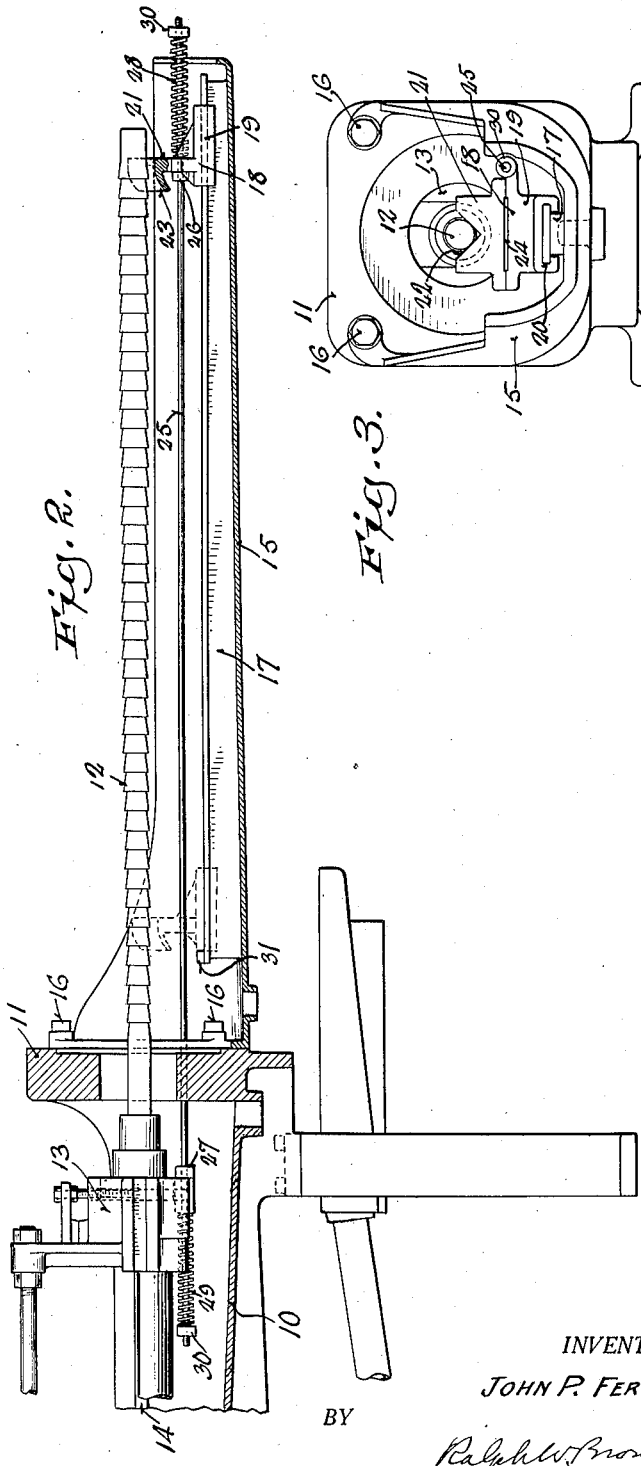
INVENTOR.
JOHN P. FERRIS
BY
Ralph W. Brown
ATTORNEY.

Patented June 15, 1926.

1,588,716

UNITED STATES PATENT OFFICE.

JOHN P. FERRIS, OF MILWAUKEE, WISCONSIN.

BROACH GUIDE.

Application filed February 16, 1924. Serial No. 693,172.

This invention relates to broach guides.

One object of the present invention is the provision of a novel means for supporting and guiding the rear end of a broaching tool during both its working and return strokes.

Another object is the provision of novel means for actuating a broach guide.

Other objects and advantages will appear from the following description of an illustrative embodiment of the invention.

In the drawings;

Figure 1 is a plan view of a portion of a broaching machine equipped with a tool guide constructed in accordance with this invention.

Figure 2 is a longitudinal sectional view of the mechanism shown in Figure 1.

Figure 3 is an end elevation.

The broaching machine shown is of a well known type, having the usual trough 10, provided at one end with the usual upstanding face plate 11, through which the tool 12 travels on its working and return strokes. The tool is actuated by the usual crosshead 13 reciprocating between the guides 14 in the trough 10.

The tool guide shown comprises a trough 15 rigidly secured to and supported by the face plate 11 by means of screws 16. The trough 15 is provided, in this instance, with a T-shaped guide rail 17 extending along the bottom thereof in a direction parallel to the path of travel of the tool. A reciprocating tool carriage 18 is provided with a base 19 having an undercut channel 20 therein shaped to slidably receive the rail 17. The carriage is also provided with a block 21 recessed to provide a V-shaped seat 22 for the tool. A downwardly inclined lip or apron 23 projecting from the face of the block 21 and merging into the seat 22 assists in returning the tool to the seat on the return stroke of the tool, as will hereinafter appear. The block 21 is preferably removably secured to the base 19 and may be replaced by similar blocks of different heights so as to accommodate the carriage to tools of various diameters. A finer vertical adjustment of the carriage may be had by the insertion of shims as at 24, between the block and base.

The carriage 18 reciprocates with the tool but is actuated by means independently of the tool. In the mechanism shown, this means comprises a rod 25 projecting at one end through an appropriate opening in the base 19 of the carriage and at the other end through an appropriate opening in the crosshead 13. This rod extends loosely through the face plate 11 and is provided with a pair of stop collars 26 and 27 adjustably fixed thereto and yieldably retained against the carriage and crosshead, respectively, by compression springs 28 and 29. The springs 28 and 29 are carried by the opposite ends of the rod 25 and are retained in position thereon by nuts 30.

In operation, the nose of the tool is projected through the work and engaged in the crosshead 13, in the usual manner, and the tail of the tool rested upon the seat 22 provided by the carriage 18. Then, as the tool is pulled through the work by the crosshead, the crosshead, through the springs 29 and 28 and the rod 25, causes a simultaneous advance of the carriage. The carriage thus advances with the tool until it reaches the dotted line position of Figure 2, where the carriage is arrested by its engagement with a stop lug 31 fixed to the forward end of the rail 17. The crosshead and tool, however, continue to advance to complete a working stroke, the yieldability of the springs 28 and 29 permitting this movement of the crosshead relative to the carriage. Ordinarily, the tool, in completing its working stroke, leaves the seat 22 on the carriage.

On its return stroke, the crosshead first advances toward the carriage 18 until both of the collars 26 and 27 on the rod have been returned to their positions of engagement with the crosshead and collar, at which time the carriage begins its return stroke and continues to travel rearwardly under the influence of the crosshead. During the initial return movement of the crosshead, the tail end of the tool is returned thereby onto its seat on the carriage, the inclined lip 23 on the carriage guiding the tool into position thereon. The tool is thus supported by the carriage during the return stroke as well as the working stroke.

Various changes may be made in the embodiment of the invention hereinabove specifically described, without departing from or sacrificing any of the advantages of the invention as defined in the appended claims.

I claim:

1. In a horizontal broaching machine the combination of tool reciprocating means, a tool guide, and yieldable connections between said means and guide for reciprocating said guide with the tool during the working and return strokes thereof.

2. In a broaching machine the combination of tool reciprocating means, a tool guide, and connections including a spring between said means and guide for reciprocating said guide.

3. In a broaching machine the combination of tool reciprocating means, a tool support, and resilient connections between said means and support for reciprocating said support.

4. In a broaching machine the combination of tool reciprocating means, a tool guide, yieldable connections between said means and guide for actuating said guide, and means for limiting the travel of said guide.

5. In a broaching machine the combination of tool reciprocating means, a tool guide, a connecting rod, and spring means associated with said rod for establishing a working connection between said reciprocating means and guide.

6. In a broaching machine the combination of tool reciprocating means, a tool guide, a connecting rod extending through said means and guide, collars on said rod, and springs on said rod for yieldably maintaining said collars in engagement with said means and guide.

In witness whereof, I hereunto subscribe my name this 23rd day of January, 1924.

JOHN P. FERRIS.